United States Patent
Schricker et al.

[11] Patent Number: 6,082,187
[45] Date of Patent: Jul. 4, 2000

[54] METHOD FOR DETECTING A POWER LOSS CONDITION OF A RECIPROCATING INTERNAL COMBUSTION ENGINE

[75] Inventors: David R. Schricker, Dunlap; Masoud K. Zavarehi, Peoria, both of Ill.

[73] Assignee: Caterpillar Inc., Peoria, Ill.

[21] Appl. No.: 09/216,597

[22] Filed: Dec. 18, 1998

[51] Int. Cl.$^7$ ................................................. G01M 15/00
[52] U.S. Cl. ........................ 73/116; 73/117.3; 123/436; 701/110
[58] Field of Search ............................. 123/436; 73/116, 73/117.3, 494; 701/110

[56] References Cited

U.S. PATENT DOCUMENTS

| | | | |
|---|---|---|---|
| 4,697,561 | 10/1987 | Citron | 123/339 |
| 5,109,695 | 5/1992 | James et al. | 73/117.3 |
| 5,176,118 | 1/1993 | Norota | 123/435 |
| 5,200,899 | 4/1993 | Ribbens et al. | 364/431.08 |
| 5,239,473 | 8/1993 | Ribbens et al. | 364/431.08 |
| 5,245,542 | 9/1993 | Itoh et al. | 364/426.02 |
| 5,278,760 | 1/1994 | Ribbens et al. | 364/424.1 |
| 5,365,780 | 11/1994 | Feldkamp | 73/117.3 |
| 5,828,976 | 10/1998 | Fukuchi et al. | 123/436 |
| 5,916,295 | 6/1999 | Colvin | 123/436 |
| 5,991,685 | 11/1999 | Fukuchi et al. | 73/117.3 |
| 6,002,980 | 12/1999 | Taylor et al. | 701/110 |
| 6,006,154 | 12/1999 | Wang | 73/116 |
| 6,021,758 | 2/2000 | Carey et al. | 123/436 |
| 6,021,765 | 2/2000 | Degroot et al. | 123/436 |
| 6,023,651 | 2/2000 | Nakayama et al. | 123/436 |

*Primary Examiner*—Erick R. Solis
*Attorney, Agent, or Firm*—Haverstock, Garrett & Roberts

[57] ABSTRACT

A method for detecting a power loss condition of an internal combustion engine, the engine having at least one cylinder and a crank shaft, the method including the steps of sensing rotational crank shaft speed for a plurality of designated crank shaft rotational positions over a predetermined number of cycles of rotation, determining an average crank shaft speed fluctuation for each crank shaft position, determining information representative of crank shaft kinetic energy variation due to each firing event in the cylinder, and determining information representative of an average fuel flow rate. Information representative of a power loss for the cylinder is determined as a function of the crank shaft kinetic energy variation, average crank shaft speed and average fuel flow rate and a representative power loss signal is responsively produced.

6 Claims, 2 Drawing Sheets

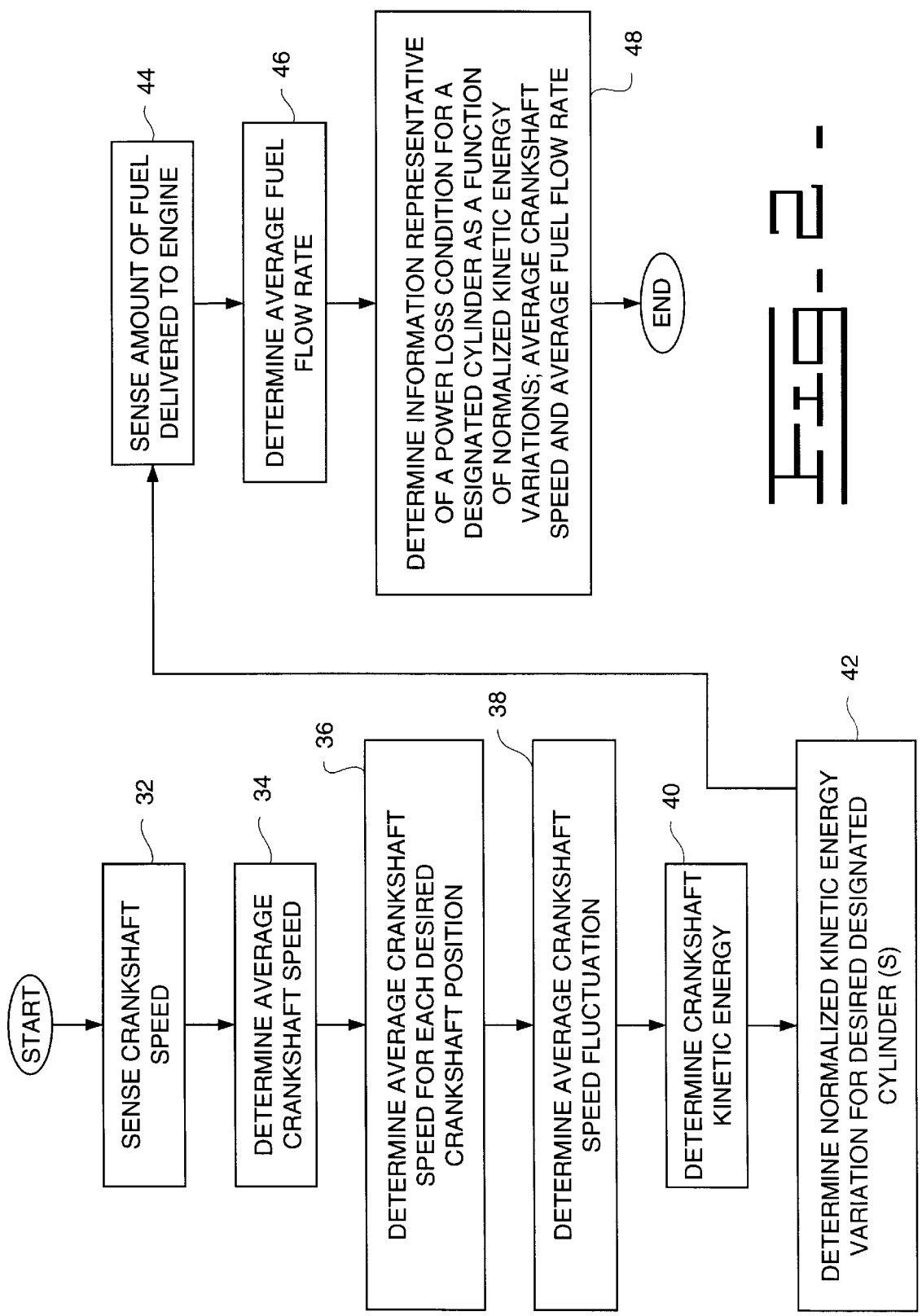

6,082,187

METHOD FOR DETECTING A POWER LOSS CONDITION OF A RECIPROCATING INTERNAL COMBUSTION ENGINE

TECHNICAL FIELD

This invention relates generally to a reciprocating internal combustion engine, and more particularly, to a method for detecting a power loss condition of a reciprocating internal combustion engine.

BACKGROUND ART

Power loss conditions in internal combustion engines present several problems, including increased down time and excess exhaust emissions.

Additionally, government regulations are making more stringent demands or limits on the exhaust emissions of internal combustion engines (diesel or spark ignited). One of the causes of exhaust emissions are complete and/or partial misfires. Another cause of a power loss may be fuel injector clogging.

The present invention is aimed at solving one or more of the problems indicated above.

DISCLOSURE OF THE INVENTION

In one aspect of the present invention, a method for detecting a power loss condition of a reciprocating internal combustion engine is provided. The engine has a plurality of reciprocating components, at least one cylinder and a crank shaft. The method includes the steps of:

sensing rotational crank shaft speed for a plurality of designated crank shaft rotational positions over a predetermined number of cycles of rotation;

determining an average crank shaft speed fluctuation for each crank shaft position;

determining information representative of crank shaft kinetic energy variation due to each firing event in the cylinder;

determining information representative of an average fuel flow rate; and determining information representative of a power loss for the cylinder as a function of crank shaft kinetic energy variation, average crank shaft speed and average fuel flow rate, and responsively producing a representative power loss signal.

BRIEF DESCRIPTION OF THE DRAWINGS

FIG. 2 is a flow diagram of a method for detecting a power loss condition of an internal combustion engine according to the present invention.

BEST MODE FOR CARRYING OUT THE INVENTION

Figure 1:
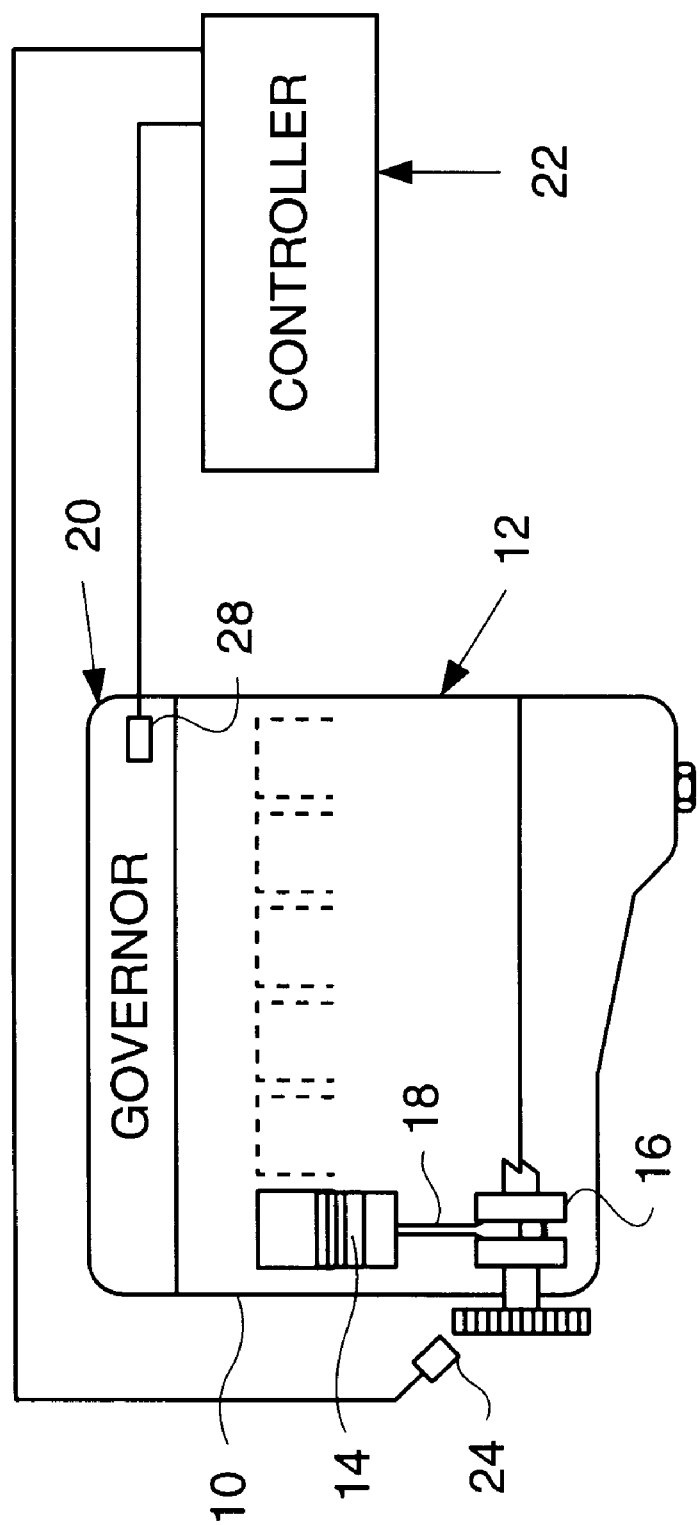
FIG. 1 is a diagrammatic illustration of an apparatus for detecting a power loss condition of an internal combustion engine according to the present invention.

With reference to FIG. 1, the present invention provides a method for detecting a power loss condition in a cylinder 10 of an internal combustion engine 12. The power loss condition is indicative of an individual cylinder degregation, e.g., due to a complete or partial misfire, clogged fuel injector, or other problem. Engine 12 is a six cylinder, compression ignited diesel engine representative of a wide variety of both spark ignited and compression ignited engines having one or more cylinders. Each of the cylinders, as represented by cylinder 10, has a piston 14 reciprocally moveable therein, the pistons 14 each being connected to a rotatable crank shaft 16 by a connecting rod for rotating the crank shaft 16. Fuel delivery from a fuel source (not shown) to the individual cylinders of engine 12 is controlled by a governor 20 in the conventional manner.

Operation of engine 12 is controlled by a controller 22 which includes a processor such as a micro-processor (not shown) operable for receiving information from a variety of sensors and other devices associated with engine 12, including, but not limited to, an engine speed sensor 24 and a fuel quantity sensor 28, both electrically connected to controller 22. The speed sensor 24 can be any suitable commercially available device, such as a magnetic pick-up that changes its output voltage whenever predetermined indicia is in proximity thereto, here such indicia being angularly spaced teeth on a crank gear of the crank shaft 16. Since the angular distance between successive indicia, that is, two successive teeth, will be known, the crank shaft speed can be determined using the data generated by the speed sensor 24. The controller 22 is operable to convert the sensor data, which is a raw voltage, into revolutions per minute (rpm). Engine speed sensor 24 is thus operable for sensing the angular speed of crank shaft 16 for a discrete plurality of angular crank shaft positions and responsively producing a crank shaft speed signal which is received by controller 22. Preferably, the angularly spaced teeth on the crank gear of crank shaft 16 are located at 10° increments around the gear circumference thereof corresponding to 10° increments around crankshaft 16, the top dead center (TDC) position for cylinder 10 being represented by a missing tooth to provide a reference point. Here, it should be recognized and understood that the angular positions around crank shaft 16 of the top dead center positions for the remaining five cylinders of engine 12 are also known.

Governor 20 is operable for controlling fuel delivery to the cylinders of engine 12, and includes a fuel quantity sensor 28 for sensing the amount of fuel requested by the governor 20, i.e., fuel flow rate, and communicating a fuel quantity signal representative thereof to controller 22.

Controller 22 further includes a memory device and a clock, and is representative of both floating point processors, and fixed point processors, operable to detect a power loss condition in any of the cylinders of engine 12 according to the teaching of the present invention as explained next.

With reference also to FIG. 2, the method according to the present invention will now be discussed.

In a first control block 32, the angular velocity or speed of crank shaft 16 as it rotates is sensed. As noted above, the teeth at predetermined angular positions around the circumference of the crank gear of crank shaft 16 provide positional information enabling the angular velocity of the crank shaft at any 10° crank shaft position to be sensed over a desired predetermined number of cycles of rotation of the crank shaft 16 (sample period). At control block 34 the average crank shaft speed is determined by controller 22 over the sample period, using all of the sensed speed information obtained for the sample period. The raw speed data is then converted into revolutions per minute (RPM) values.

At control block 36, the average crank shaft speed for a desired number of crank shaft positions is determined. That is, the instantaneous crank shaft speed for each selected crank shaft position is averaged for the number of cycles in the sample period. This removes the effects of noise and external load disturbance other than malfunctions sought to be detected, such as problems relating to the fuel injector and the like discussed above. This also increases resolution for differentiating between slight cylinder power losses. Here, it should be noted that each engine cycle comprises two revolutions of crank shaft 16 (720°), including a firing event near the TDC of one of the revolutions, controller 22 being operable to distinguish the TDC position using cam gear positional data or the like. The speed data is arranged into 720° engine cycle segments measured from a selected TDC for the cylinder 10. Each speed segment will consist of 72 data points corresponding to 10 degree increments for two crank shaft revolutions per cycle equating to 36 teeth around the circumference of the crank gear, including the missing tooth for the TDC for the cylinder 10 per crank revolution. The average crankshaft speed is preferably determined using at least 15–20 of such speed segments. Here, the standard deviation of the speed segments can be determined as well, and if the speed standard deviation at any point is beyond a certain threshold (indicating an unsteady condition), new crankshaft speed data should be collected.

Next, at control block 38, average crankshaft speed fluctuation is determined. This function is performed by subtracting the average crank shaft speed for each crank shaft position determined in block 36 from the average crank shaft speed determined in block 34.

At block 40, the crankshaft kinetic energy variation due to each firing event for each cylinder is then computed. This computation involves integrating the average crankshaft speed fluctuation determined in step 38 with respect to a crankshaft angle from $\theta_{i1}$ to $\theta_{i2}$ where $\theta_{i1}$ is defined as the desired crank shaft angle before TDC for the ith firing cylinder (measured from the ith TDC position) and $\theta_{i2}$ is the crank shaft angle after the TDC for the ith firing cylinder, and $\theta_{i2}-\theta_{i1}=720°/N$ wherein N is the number of cylinders. By integrating the crank shaft speed, the amount of speed information for further processing per engine cycle is reduced from nN to N, where n is the number of teeth passing the speed sensor per cylinder firing.

The instantaneous kinetic energy of the rotating parts of the engine is given by:

$$E_k = \frac{1}{2}I_e\dot\theta^2$$

where $I_e$ is the average equivalent inertia of all the engine rotating parts, and $\theta$ is the instantaneous angular velocity of the crank shaft The variation of the shaft kinetic energy due to combustion disturbances is given by differentiating $E_k$, or $$\delta E_k = I_e \delta\dot\theta\dot\theta = I_e \delta\theta \frac{d\theta}{dt}$$

where $\delta\theta$ is the small angular velocity fluctuation of the crank shaft about its mean cycle value.

The total amount of kinetic energy that the crank shaft and other rotating parts have gained or lost during the time period $\Delta t$ is therefore given by integrating $\delta E_k$ with respect to time; i.e., total energy gained (or lost)=

$$\int_{ti}^{tf} \delta E_k dt = I_e \int_{-60}^{+60} \delta\dot\theta d\theta$$

where $\Delta t = t_f - t_i$ and is the interval during which the crank shaft has rotated 120° centered about a TDC position for a cylinder. The kinetic energy is preferably computed for only the period between 60° before TDC and 60° after TDC which reduces the speed data from 72 to 6 data points for each engine cycle.

As a next step, as shown in control block 42, the normalized kinetic energy variation for a designated cylinder or cylinders is determined. This is accomplished by dividing the kinetic energy level data by at least one predetermined constant, which can include, but is not limited to, a maximum absolute level of kinetic energy variation. Optionally, to obtain greater accuracy, the normalized kinetic energy changes may be subtracted from a normalized kinetic energy value for a normal engine, that is, an engine without a power loss, operating under the same conditions.

At block 44, the amount of fuel being delivered to the engine is sensed, using fuel quantity sensor 28 and the signal therefrom is electrically communicated to controller 22.

At block 46, the average fuel flow rate is determined from the fuel quantity signal.

At block 48, information representative of a power loss condition for a designated cylinder is determined as a function of normalized kinetic energy variations, average crankshaft speed, and average fuel flow rate, and a representative power loss signal is generated using a neural network or other suitable pattern matching algorithm.

According to a preferred embodiment, the power loss is determined using a neural network model based preferably, on radial basis function approximators, the output of which is a real-valued number representing the estimated power loss for each tested cylinder at a designated test point. Each radial basis (RB) network has three layers: the input layer, the hidden layer, and the output layer. In turn, each layer has several processing units, called cells, which are joined by connections. Each connection has a numerical weight, $W_{ij}$, that specifies the influence of cell $C_i$ on cell $C_j$, and determines the behavior of the network. Each cell $C_i$ computes a numerical output which equates to the power loss for the cylinder.

Since engine 12 has six cylinders, and power loss is determined as a function of kinetic energy variation, average crankshaft speed and average fuel flow rate, the RB network for each cylinder will have eight inputs, including: inputs 1–6 corresponding to the normalized kinetic energy variation for each of the cylinders; input 7 is the average crankshaft speed; and input 8 is the average fuel flow rate. The cells in the input layer normalize the input signals received (preferably, between −1 and +1) and pass the normalized inputs to Gaussian processing cells in the hidden layer. This makes the inputs uniform regardless of the dimensions and units thereof. A linear mapping function is used to normalize each of the 8 inputs to the network according to its maximum and minimum variation levels, such that $C_i = A_i + b_i I_i (i=1,2,\ldots 8)$ Where $I_i$ is the ith real valued input, $-1 \le C_i \le +1$ is the normalized output of the ith input cell, and the coefficients $A_i$ and $b_i$ are tabulated values maintained in memory.

The hidden layer is determined from real value training examples ($E^i$) for p number of input cells, here p equalling 8. Using a real valued function, for each training example $E^i$, an intermediate cell output $C_{p+i}$ can be generated when presented with an input vector E as follows $$C_{p+i} = f(\|E-E^i\|)$$

Here the normalized quantity $\|E-E^i\|$ is the Euclidean distance between the input vector E and the training vector $E^i$. For the function, a Gaussian distribution function such as the function $$f(E - E^i) = \exp\left[-\left(\frac{\|E - E^i\|}{\sigma_i}\right)^2\right]$$

is used where $\sigma_i$ is the width of the ith hidden cell. Preferably, the hidden cell activations $C_{p+i}$ from the input training data sets are computed using a default value of $\sigma_i=0.833$ for all hidden cells.

For the output layer, the intermediate cells are used as a basis to represent real valued outputs, which is the predicted power loss for the particular cylinder. Assuming that the power loss is a linear function, the power loss is a summary of the hidden cell outputs $C_{p+i}$ and the numerical weights such that $$\overset{\circ}{C} = \sum_{j=1}^{m} W_p + {}_jC_{p+j}$$

where m is the number of cells in the hidden layer.

As an alternative method, using a fixed point processor, a linear neural network approach can be used. In the linear neural network approach, the inputs and outputs are in binary −1 (or 0) +1 format, rather than the real-valued input and output data used in the radial basis neural network. Using this approach, power loss is determined to be the highest-valued output.

Industrial Applicability

With reference to the drawings and in operation, the present invention provides a method for detecting a power loss condition of a cylinder or other combustion chamber of an internal combustion engine having distinct firing events, as a function of kinetic energy variation, average engine speed and average fuel supply rate. According to the present invention, a representative power loss signal is responsively produced and communicated to an onboard indicator light, stored and/or transmitted to a base station for subsequent action.

Other aspects, objects and advantages of the present invention can be obtained from a study of the drawings, the disclosure and the appended claims.

What is claimed is:

1. A method for detecting a power loss condition of a reciprocating internal combustion engine, the engine having at least one cylinder and a rotating crank shaft, comprising the steps of:

sensing rotational crank shaft speed for a plurality of designated crank shaft rotational positions over a predetermined number of cycles of rotation for each crank shaft position;

determining an average crank shaft speed fluctuation for each crank shaft position;

determining information representative of crank shaft kinetic energy variation due to each firing event in the cylinder;

determining information representative of an average fuel flow rate; and determining information representative of a power loss for the cylinder as a function of crank shaft kinetic energy variation, average crank shaft speed and average fuel flow rate and responsively producing a representative power loss signal.

2. The method, as set forth in claim 1, further including the step of determining a normalized kinetic energy variation for the cylinder, wherein information representative of a power loss for the cylinder is determined as a function of the normalized kinetic energy variation, average crank shaft speed and average fuel flow rate.

3. The method, as set forth in claim 1, wherein the designated plurality of crank shaft positions comprise crank shaft positions within a predetermined range of crank shaft positions before and after a top dead center position for the cylinder.

4. The method, as set forth in claim 3, wherein the predetermined range comprises a range of from about 60° before the top dead center position to about 60° after the top dead center position.

5. The method, as set forth in claim 1, wherein the step of determining the power loss is performed using a neural network.

6. The method, as set forth in claim 5, wherein the step of determining the power loss is performed using a radial basis neural network.

\* \* \* \* \*